(12) United States Patent
Bailey et al.

(10) Patent No.: US 12,200,027 B2
(45) Date of Patent: Jan. 14, 2025

(54) SELECTIVE CHANNEL LIVE PRODUCTION SYSTEM AND METHOD

(71) Applicant: Prodcom LLC, Cumming, GA (US)

(72) Inventors: Stephen Bailey, Cumming, GA (US); Justin Tyre, Cumming, GA (US)

(73) Assignee: PRODCOM LLC, Cumming, GA (US)

( * ) Notice: Subject to any disclaimer, the term of this patent is extended or adjusted under 35 U.S.C. 154(b) by 71 days.

(21) Appl. No.: 18/071,498

(22) Filed: Nov. 29, 2022

(65) Prior Publication Data
US 2024/0176462 A1    May 30, 2024

(51) Int. Cl.
| | |
|---|---|
| *H04L 65/403* | (2022.01) |
| *G06F 3/04817* | (2022.01) |
| *G06F 3/0482* | (2013.01) |
| *G06F 3/0484* | (2022.01) |
| *G10L 15/26* | (2006.01) |
| *H04L 12/18* | (2006.01) |
| *H04W 4/08* | (2009.01) |

(52) U.S. Cl.
CPC ........ *H04L 65/403* (2013.01); *G06F 3/04817* (2013.01); *G06F 3/0482* (2013.01); *G06F 3/0484* (2013.01); *G10L 15/26* (2013.01); *H04L 12/1822* (2013.01); *H04W 4/08* (2013.01); *G06F 2203/04803* (2013.01)

(58) Field of Classification Search
CPC .. G06F 3/0484; G06F 3/04817; G06F 3/0482; G06F 2203/04803; G10L 15/26; H04L 12/1822; H04L 65/403; H04M 3/56; H04Q 2213/13175; H04W 4/08
See application file for complete search history.

(56) References Cited

U.S. PATENT DOCUMENTS

| | | |
|---|---|---|
| 6,332,122 B1 | 12/2001 | Ortega et al. |
| 8,209,183 B1 | 6/2012 | Patel et al. |
| 8,934,652 B2 | 1/2015 | Lord et al. |
| 9,053,750 B2 | 6/2015 | Gibbon et al. |
| 9,245,254 B2 | 1/2016 | Lord et al. |
| 9,280,972 B2 | 3/2016 | McCulloch et al. |
| 10,177,926 B2* | 1/2019 | Barsoba .............. H04L 12/1822 |
| 10,902,205 B2 | 1/2021 | Cai et al. |
| 10,951,753 B2* | 3/2021 | Tan ........................ H04W 76/45 |
| 11,069,367 B2 | 6/2021 | Gibbon et al. |
| 11,232,266 B1 | 1/2022 | Biswas et al. |
| 2004/0267527 A1 | 12/2004 | Creamer et al. |
| 2008/0261576 A1* | 10/2008 | Wengrovitz ............ H04M 3/56 |
| | | 455/416 |
| 2011/0271212 A1* | 11/2011 | Jones .................... H04M 3/567 |
| | | 715/753 |
| 2013/0109425 A1* | 5/2013 | Kerger .............. H04M 1/72469 |
| | | 455/518 |

(Continued)

*Primary Examiner* — Nicholas Ulrich
(74) *Attorney, Agent, or Firm* — Fish & Richardson P.C.

(57) ABSTRACT

Methods, systems, and apparatus, including computer programs encoded on a computer storage medium, for selecting and processing communication channels in a live production environment. In one aspect, a conversation status of each of a plurality of communication channels is determined. Channels belonging to a first group status are grouped into a first set, and channels belonging to a second group status are grouped into a second set. Display data is generated to indicate the respective groupings, and audio and text is selectively displayed on user devices according to the groupings.

10 Claims, 7 Drawing Sheets

(56) References Cited

U.S. PATENT DOCUMENTS

| | | | | |
|---|---|---|---|---|
| 2015/0106091 | A1 | 4/2015 | Wetjen et al. | |
| 2019/0222989 | A1* | 7/2019 | Cannata | H04W 4/06 |
| 2020/0137140 | A1* | 4/2020 | Laukkanen | H04L 67/535 |
| 2021/0400145 | A1* | 12/2021 | Yoon | H04W 76/14 |
| 2022/0407733 | A1* | 12/2022 | Roedel | G06F 3/0481 |

* cited by examiner

SELECTIVE CHANNEL LIVE PRODUCTION SYSTEM AND METHOD

BACKGROUND

In live production environments, clear communication between producers, camera operators, video directors, lighting and spot operators, audio engineers, talent and musicians is essential for the operation and continuity of the production or event. Despite being so critical, clear and accurate communication between relevant parties is one of the most difficult and challenging things to achieve in these types of settings.

Because of the fast-paced environment of a live production environment, the industry has adopted voice as the primary means of communication, due to both ease for the communicator (generally not needing visual attention and only requiring a single button press) and the inherent nature of it being relayed to the listener in real time. These types of systems that use voice for communication include party line communication systems, radios, and microphones that are routed through audio mixers or servers.

While the industry has adopted voice as the primary method of communication in live productions, there are a number of very common issues that are found in virtually every live production environment that make voice communication difficult, ineffective and occasionally dangerous. These issues include missed communications, too much information, loud background noise, quiet environments, accuracy, accessibility, and accountability.

Missed communications are common in a live production. Thus, it can often be difficult to leave a station for any reason, including using the restroom. Even when a person is able to step away, the person may have have no way to know who was trying to reach him during the absence and what information he might have missed.

Too much information is also a challenge. It is very common for an intended recipient to receive multiple messages simultaneously. This requires the recipient to ask all the communicating/transmitting individuals to pause, and then speak individually one at a time repeating what they already said. This is often too time consuming for a fast-paced environment, and the workflow is inefficient.

Loud background noise also presents problems. Concerts and sporting events have loud public address systems and/or excessive crowd noise that easily drown out voice communication, even when using isolating headsets. This forces a listener to turn up the volume on a headset or earpiece significantly, which eventually decreases the intelligibility of the speech source due to distortion and increases the likelihood of damaging the listener's hearing.

Also, a quiet environment presents its own challenges. In many cases and especially in smaller production environments, using a radio or a "shout system" (a small speaker to locally broadcast voice communication) is not appropriate, as the audio these systems generate is a major source of distraction in a quiet environment.

Accuracy also sufferers. Considering the often extreme noise levels in live production environments, it can be very common for a listener to miss a word or two in an entire phrase being communicated to them. This requires the listener to ask the communicating/transmitting individual to repeat the entire phrase again, which is time consuming and ultimately frustrating for all involved.

Accessibility also is an issue for some individuals. With the industry standards that exist in live production it is very difficult, if not impossible, for someone that is deaf or hard of hearing to work effectively in these settings.

Finally, accountability is also a challenge. It is nearly impossible for supervisors or managers to track or prove a discrepancy in communication or even verbal abuse that happens over these systems. There is no practical solution to record audio over these closed systems, which itself would have extremely high data storage requirements compared to saving the text data from transcription of this audio.

SUMMARY

This specification describes technologies relating to a selective channel live production system, and in particular to a live production system that augments an incoming communication (e.g., voice audio) with additional communication data (e.g., text from a speech to text process), and presents the incoming communication and additional communication data to recipients according to the status of the communication channels for each of the recipients.

In general, one innovative aspect of the subject matter described in this specification can be embodied in methods that include the of for each communication channel of a plurality of communication channels, determine a grouping status of the communication channel, the grouping status for each communication channel defining one of a particular group to which the communication channel belongs or that the communication channel does not belong to a particular group; determining a first set of communication channels belonging to a first group; receiving, from each communication channel of the plurality of communication channels, communication data input by a user that is assigned to the communication channel; generating display data that causes a user device to display a user interface comprising: a first display area listing actionable icons, each respective actionable icon corresponding to a respective communication channel, each actionable icon including a label displaying an identifier of the communication channel and a visual indicator, and wherein each actionable icon for each of communication channels that belongs to the first group has a first visual indictor; a second display area in which, for each communication channel belonging to the first group for which communication data is received, text data based on the communication data is displayed, and wherein the text data for each communication channel is labeled with an identifier of the communication channel; providing the display data to a plurality of user devices, each user device associated with a respective one of the communication channels belonging to the first group, and having a display in which the user interface based on the display data is displayed; receiving, from one of the user devices associated with a first actionable icon that corresponds to a communication channel belonging to the first group, selection data indicating a selection of a second actionable icon; in response to the selection data: changing the grouping status of the communication channels corresponding to the first actionable icon and the second actionable icon to cause the communication channels to belong to a second group, generating updated display data that changes the visual indicator of the first actionable icon and the second actionable icon to a second visual indicator that is different from the first visual indicator; and providing the updated display data to each of the user devices. Other embodiments of this aspect include corresponding systems, apparatus, and computer programs, configured to perform the actions of the methods, encoded on computer storage devices.

Another innovative aspect of the subject matter described in this specification can be embodied in methods that include the actions of displaying, in a user interface of the user device: a first display area listing a respective actionable icon for a respective communication channel of a plurality of communication channels, each actionable icon including a label displaying an identifier of the communication channel and a visual indicator, and wherein each actionable icon for each of the communication channels that belongs to a first group has a first visual indictor; a second display area in which, for each communication channel of the first group for which voice communication data is received, text data based on the voice communication data is displayed, and wherein the text data for each communication channel is labeled with an identifier of the communication channel; wherein in response to the user device being associated with a first actionable icon for a communication channel belonging to the first group, the user device presents voice communication data from all other communication channels belonging to the first group, and not presenting voice communication data from other channels that do not belong to the first group; in response to a selection by a user of the user device of a second actionable icon displayed in the user interface: the grouping status of the communication channels associated with the first actionable icon and second actionable icon are changed to belong to a second group; the visual indicators of the first actionable icon and second actionable icon are changed to a second visual indicator that is different form the first visual indicator; and the user device presents voice communication data from only the communication channel associated with the second actionable icon. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The grouping of channels by grouping status and the display of the channels grouped according to the respective groups to which they belong enables the routing of communications dynamically to intended recipients, and also informs all users with display devices of the communication status of the communication channels. This reduces cross-talk situations that would otherwise occur in response to time-sensitive developments.

Moreover, the use of speech-to-text (STT) enables a text log of conversations for each group of communication channels, which, in turn, allows users to review the conversation as necessary without asking for repeats. Additionally, the use of text-to-speech (TTS) enables a user to engage in a conversation when the user is in an environment that requires discretion or quiet. The TTS audio is also generated for the benefit of users that do not have display user interfaces (e.g., a producer behind the stage, a director, etc.). The generated text also eliminates the need for stored audio for later review, which reduces storage requirements.

The use of a touch-to-talk (TTT) model enables on-the-fly grouping of two or more communication channels to establish direction communications among the recipients, which again is beneficial for time critical situations. Additionally, in some implementations, the user interface in user devices for the grouped communication channels in a first group shows a separate display area in which the text of the conversation is displayed. This on-the-fly partitioning of textual data according to respective channel groupings over time allows for easy review by all participants in the conversation, and from a technical aspect, allows for on-the-fly partitioning of the textual data in near real time.

The use of hot words/keywords to manage communication channel status enables the users that are at audio stations that require constant manipulation (e.g., an audio mixer managing sound during a performance transition) to still initiate direct conversations with others by a hot work/keyword utterance (e.g., "go direct with Sean", where "go direct" is a hot word phrase that will initiate a direct communication over the channel(s) of the identified recipient(s)).

Some implementations allow channels to revert to prior groups after a separate, ad-hoc grouping is complete. This "grouping memory" enables the dynamic creation of "side groups" that, upon completion, returns the communication channels to their prior groups. This ensures that channel groupings that were established for an intended purpose are not affected by one or more users temporarily leaving one or more groups to have a separate conversation to address a pressing issue. In some implementations, each channel may have a nested "group history" that allows the channel to continue to revert to prior groupings when a user of the channel leaves an ad-hoc or subsequent group.

The selective channel live production (SCLP) system can easily be deployed alongside and/or integrated with current industry standard communications systems to address the main issues users experience. Real time communication will always be required in live production environments, and voice will continue to be the most effective method for years to come due to its inherent nature of being real time as well as ease of use by the one speaking. Because the SCLP system can, in some implementations, be implemented as an "add on" to existing system, it does not change or impact existing infrastructure or workflows, lending a useful yet very cost effective solution.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5-8 are illustrations of a user interface displayed on a user device during a selective grouping and ungrouping of communication channels.

Like reference numbers and designations in the various drawings indicate like elements.

DETAILED DESCRIPTION

Figure 1:
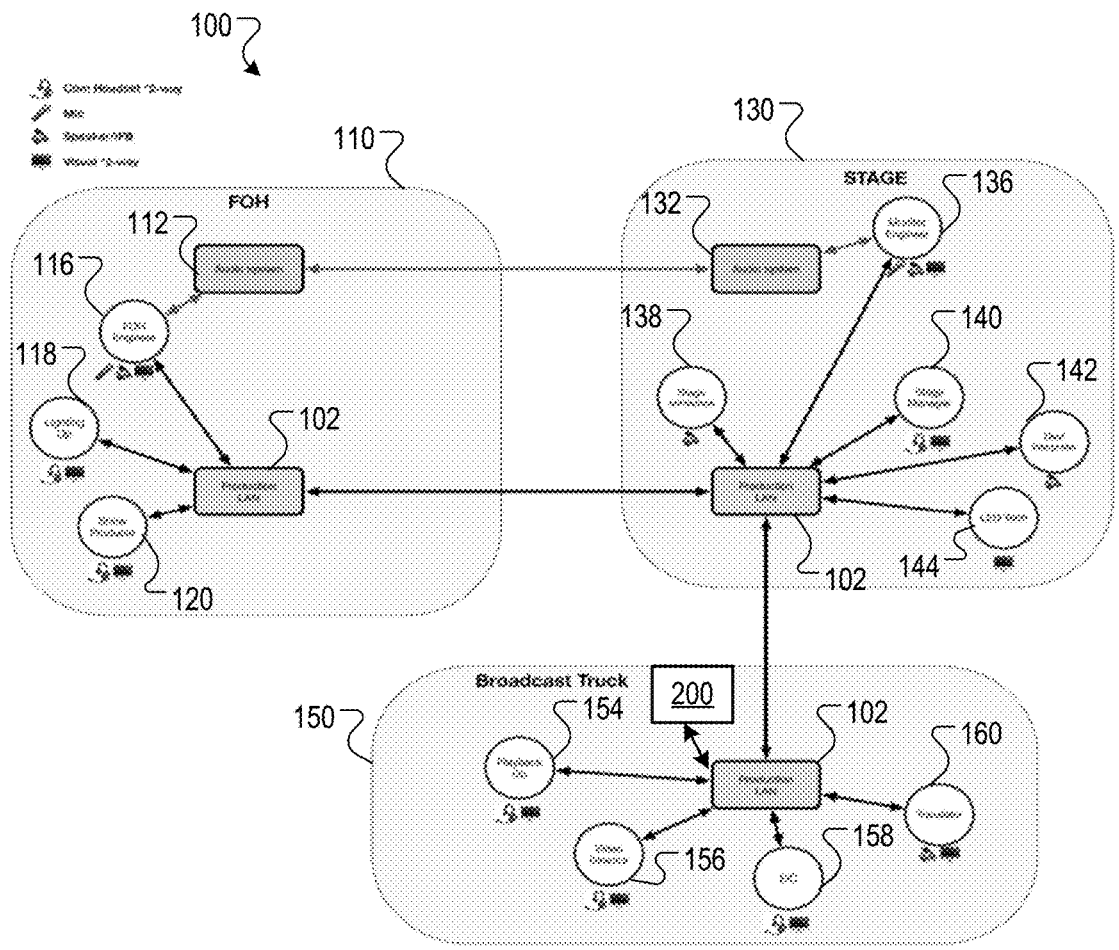
FIG. 1 is a system block diagram of a selective channel live production (SCLP) system environment.

FIG. 1 is a system block diagram of a selective channel live production (SCLP) system environment 100. The example environment 100 in FIG. 1 is illustrative and environments with more or fewer components can utilize the features of the systems and methods described below.

The environment 100 includes three separate production areas—a front of house (FOH) production area 110, a stage production area 130, and a broadcast truck 150. Each are physically separated from each other, e.g., the users in the stage environment are physically separated, often in different parts of a building, from the FOH environment, and both the FOH environment 110 and the stage environment 130 are physically separated from the broadcast truck 150, which typically is outside a building. The FOH environment 110 and the stage environment 130 include respective audio systems 112 and 132. These audio systems 112 and 132 are used for mixing sound, adjusting sound levels, and so on. Examples of these systems include digital mixing systems, analog mixing systems, and the like. Other systems, such as lighting systems, may also be used.

As shown in FIG. 1, the FOH audio system 112 is controlled by a FOH engineer by use of user device 116, which may include one or more of a communication head set, microphone, speaker, and computer. The stage audio system 132 is likewise managed by an engineer by use of a similar user device 136. The devices 116 and 136 are connected to the audio systems 112 and 132, respectively, and are connected to a production local area network (LAN) 102. The production LAN may be a wired or partially wired, partially wireless LAN. In some implementations, the audio systems 112 and 132 may also be connected to the LAN.

Other production users may be involved in managing the production, as indicated by user device 118 for a lighting operator, user device 120 for a show producer, user device 140 for a stage manager, user device 142 for a deaf interpreter, and user device 144 for a LED technician. Some user devices need not be manned, such as the speaker 138 for stage announcements.

The broadcast truck 140 includes additional production workers, as indicated by a user device 154 for a playback operator, user device 154 for a video director, user device 158 for a broadcast engineer, and a user device 160 for a translator.

As will be described below, each person on a user device will have a communication channel associated with that person, and thus with the person's user device. While some users may have a device that is audio only, e.g., a communication headset, some users may have user devices that include keyboards, input devices and a display, such as a computer system. By use of these input/output devices, the users may selectively create direct channels with other users to discuss production issues.

When a communication channel is in a group status, e.g., belongs to a first group of communication channels, audio and textual data input into the device of the channel will be provided to each other user device in the first group. This is akin to a "party line," where everyone may speak and be heard. While this works well in a production environment, there may be times when a user may need to discuss a production issue specific to another user. According to the features described below, the user may initiate another group to communicate separately with the other user. This changes the communication status of the communication channels of the user and the other user to belong to a second group that is separate from the first group, and while in this status, the audio input by the users is not broadcast to the other users, and vice versa.

For example, assume the stage manager desires to speak directed to the FOH engineer, but others are discussing an issue on the channels that belong to a first group. The stage manager may initiate a change to the communication channels associated with the user device 140 and the user device 116 so that they belong to a second group, and thereafter their voice input is provided only over the communication channels for their respective devices.

Of course, other devices may also belong to other groups, and more than two devices may have their communication channels grouped in a second group. For example, the broadcast engineer, the show producer, and the playback operator may need to discuss a particular production issue. One of them may initiate a communication among the three of them and the communication channels for the user devices 120, 154 and 158 may be grouped according to the change of their communication channels to a third group. Thus, there may be multiple different sets of communication channels grouped in separate groups. For example, as described above, the communication channels for user devices 116 and 140 may be grouped into a second group, and the communication channels for the user devices 120, 154 and 158 may be grouped together in a third group, and so on.

The channels can be group according to any appropriate data representation, e.g., a tuple that includes a channel identifier, X and a group identifier G: [X; G], where the value of X is the channel identifier, the value of G may be a group number, e.g., 1, 2, 3, etc. G may be incremented for each new group created. Thus, in the example above, the communication channels for the devices 116 and 140 would have the tuples [116, 2] and [140, 2], respectively, and the communication channels for the devices 20, 154 and 158 would have the tuples [20, 3], [154, 3] and [158, 3], respectively. All other devices would have the tuple of [X, 1], where X is their respective channel identifier.

Figure 2:
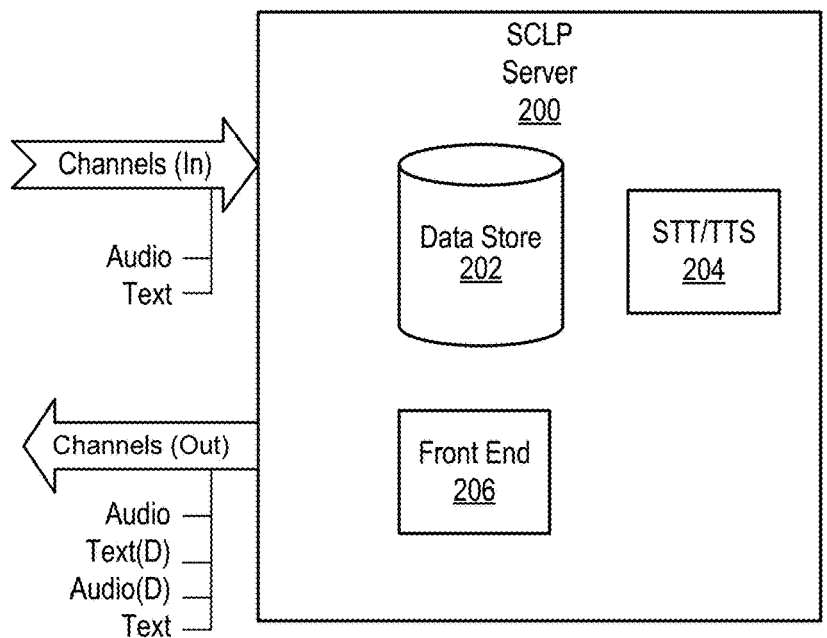
FIG. 2 is a block diagram of a SCLP server.

These features and additional features are described in more detail with reference to FIG. 2, which is a block diagram of a SCLP server 200, and FIG. 3, which is a flow diagram of example processes 300 and 350 of selective channel presentation in the SCLP system. Operation of the SCLP server 200 is described with reference to FIG. 3.

While a server implementation is described, the systems and methods can also be implemented in a peer-to-peer system. Such a peer-to-peer system is describe with reference to FIG. 11.

The SCLP server 200 can be connected at any location on the production LAN 102, and thus is data communication with the user devices 116, 118, 120, 136, 138, 140, 142, 144, 154, 156, 158 and 160. The server 200 is a data processing apparatus that includes a data store 202, a STT/TTS system 204, and a front end 206. Additional components of the data processing apparatus are described below. The SCLP server 200 receives communication data input from the communication channels. The input may be voice data, and/or text data, depending on the capabilities of the device assigned to each respective communication channel.

The data store 202 also stores instructions executable by the server 200 that, upon execution, cause the server 200 to perform operations described below. The data store 202 also stores data such as text received from the communication channels, and in the case of audio data, text data that has been generated by use of the speech-to-text/text-to-speech (STT/TTS) system 204. The data store 202 also stores data describing the communication status of each communication channel, and data describing their respective grouping according to their respective communication status. In implementations that support reversion to prior groups, a grouping history for each channel is stored, with a current grouping the most recent in the history. When the channel leaves the grouping, it reverts to a next most recent grouping. An example channel history may be of a tuple of the form [X; G1, G2 . . . Gn], where X is a channel identifier, and the values G1 . . . Gn are a group history, with G1 being the most recent group value.

For example, assume channel 10 was grouped in group 1, then group 3, and then, from group 3 to group 5. Its corresponding history tuple would be [10; 1, 3, 5]. Upon leaving group 5, channel 10 would revert to group 3, and its history would thus represented by the tuple [10; 1, 3]. Should a channel grouping in an intermediate history value be eliminated while a channel is grouped in a subsequent grouping, the intermediate value can be eliminated. For example, assume the tuple history is [10; 1, 3, 5]. While channel 10 is on group 5, the remaining channels for group 3 all leave. The history tuple for channel 10 would thus change to [10; 1, 5].

According to these groupings, the SCLP server 200 routes communications to the output channels. The communication data provided over the output channels may include audio data, such as spoken data, and text data, indicated by Text(D), derived from the STT/TTS subsystem 204.

In the case of a communication channel that provides text as input, such as may be the case of a FOH engineer communicating in a quiet environment, the output may include the text and may include the derived audio, as indicated by Audio(D).

The front end 206 generates display data that is used to present a user interface on each user device that has a display. The instructions can be a mark-up language or other display data that can cause a user device to display the user interfaces of FIGS. 5-9, which are described below.

Figure 3:
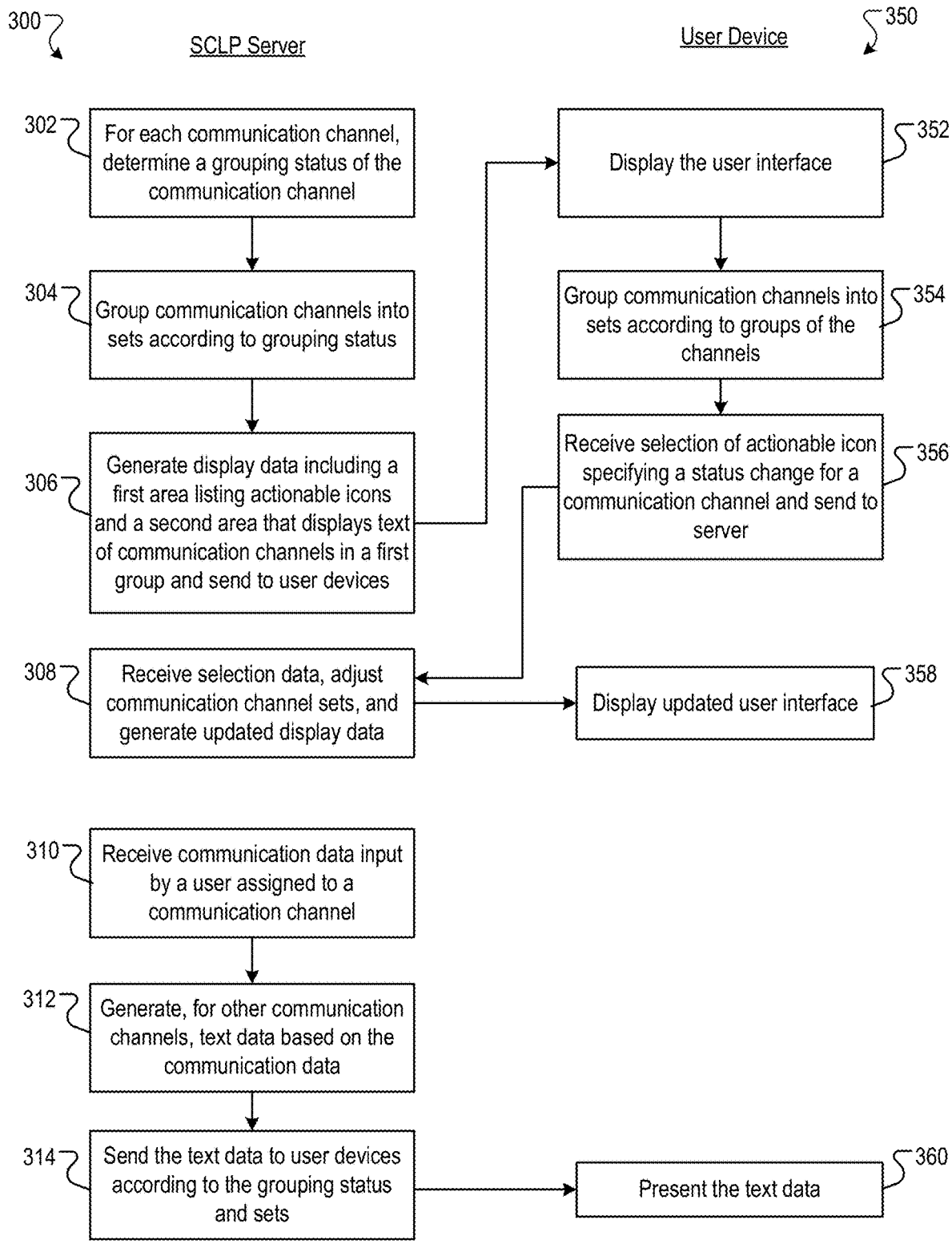
FIG. 3 is a flow diagram of example processes of selective channel presentation in the SCLP system.

Turning now to FIG. 3, the process 300 occurs in the SCLP server 200, and the process 350 occurs in a user device that includes a display device, such as a client computer.

The server 200, for each communication channel of multiple communication channels, determines a grouping status of the communication channel (302). The grouping status for each channel determine which group of communication channels a particular channel belongs to, if any. This can be determined by accessing data stored in the data store 202, for example. Upon system initialization, in some implementations, all communication channels default to a first group status. In other implementations, other default initializations can be used. Other ways of determining the grouping status of channels can also be used.

The server 200 groups communication channels into sets according to the grouping status of each channel (304). For example, the server 200 determines a first set of communication channels having first group status belong to a first group, and a second set of communication channels having a second group status belong to a second group. As described above, there could be other separate groups of communication channels as well.

The server 200 generates display data that causes a user device to display a user interface including a first area listing actionable icons and a second area that displays text of communication channels in a first group status and sends the display data to user devices (306). Each respective actionable icon corresponds to a respective communication channel, and includes a label displaying an identifier of the communication channel and a visual indicator. Each actionable icon for each of the communication channels that belong to the first group a first visual indictor, and each actionable icon for each of the communication channels that belong to a second group have a second visual indictor that is different from the first visual indicator. The second display area displays, for each communication channel of the first group for which communication data is received, text data based on the communication data. The text data for each communication channel is labeled with an identifier of the communication channel. Examples of these user interfaces are illustrated in FIGS. 5-9.

The user device receives the display data and displays the user interface (352). The display data causes the user device to group communication channels into sets according to the groups of the channels (354).

During operation, a user device receives a selection of an actionable icon specifying a status change for a communication channel and sends the selection to the server (356). As described above, for example, a user on a device may wish to initiate a direct communication with another user on another device, and thus selects an actionable icon in the user's user device that corresponds to the other user's user device.

The server 200 receives selection data, adjusts communication channel status and communication channels sets accordingly, and generates updated display data and sends the updated display data to the user devices (308). For example, the server 200 may receive, from one of the user devices associated with a first actionable icon that is associated with a channel belonging to the first group, selection data indicating a selection of a second actionable icon. The channel of the second actionable icon may belong to the first group, or some other group. In response, the server 200 changes the status of the communication channels associated with the first actionable icon and the second actionable icon so that they belong to a new group, e.g., a third group, and changes the visual indicators of the first actionable icon and the second actionable icon so that they are visually unique from the other actionable icons and thus representative of the third group.

The user device receives the updated display data and displays the updated user interface (358).

Coincident with the processing described above, the server 200 also processes communication data and provides the communication data received to other communication channels according to their corresponding groups and respective sets. In particular, communication channels that belong to the first group have their respective communication data provided to each communication channel of the first group, while communication channels that belong to a second group have their respective communication data provided to only the communication channels that belong to the second group.

In operation, the server 200 receives communication data input by a user assigned to a communication channel (310). The server 200 then generates, for other communication channels, text data based on the communication data. If the communication data received is text data, then the text data generated for the other communication channels is the text data received. Conversely, if the communication data received is voice audio data, then the text data generated for the other communication channels is the text data derived from the voice audio data by a STT/TTS subsystem 204.

The server 200 then sends the text data to user devices according to the communication channel status and sets (314), as described above. The user devices that receive the text data then present the text data in the second area of the user interface (358).

Figure 4:
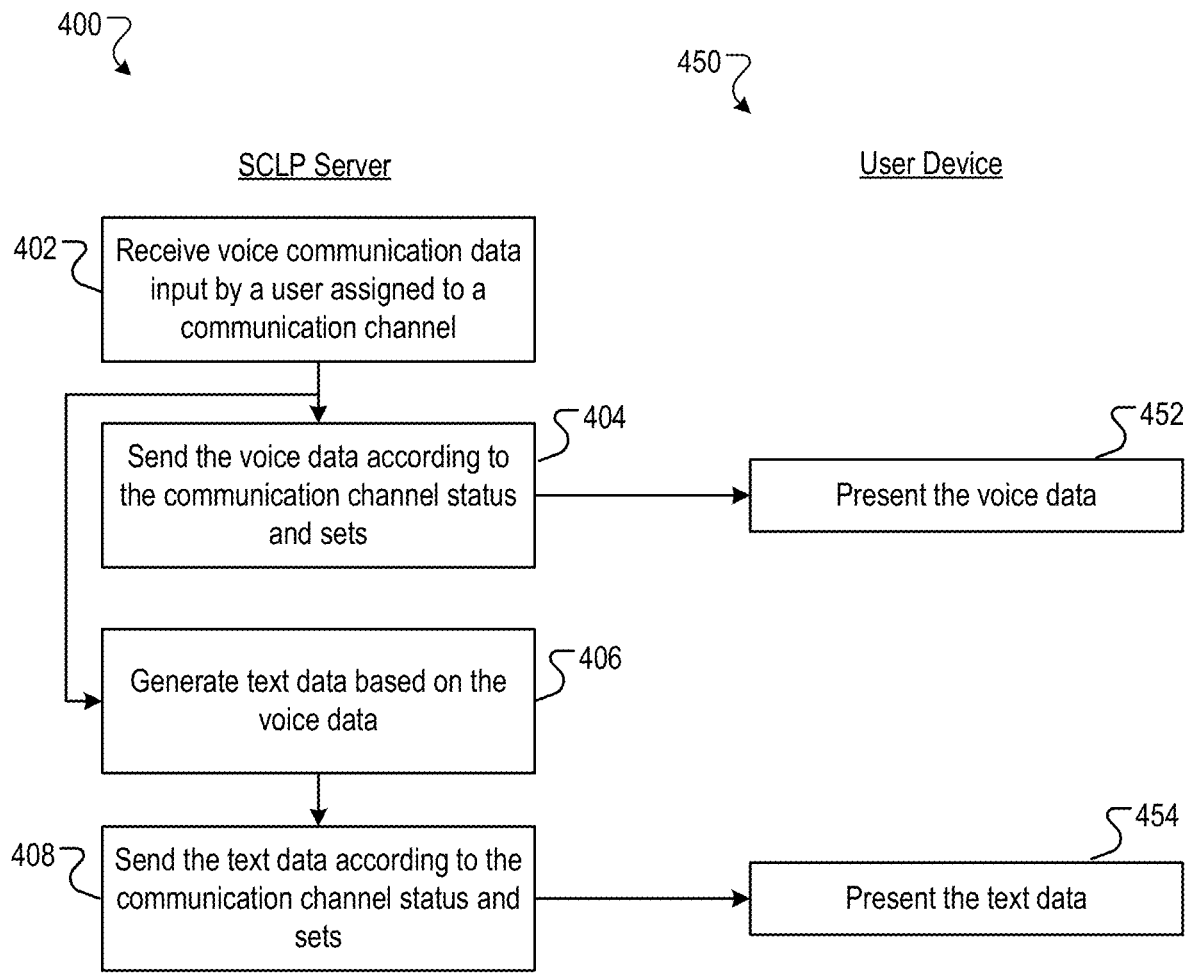
FIG. 4 is another flow diagram of additional example processes of selective channel presentation in the SCLP system.

FIG. 4 is another flow diagram of additional example processes 400 and 450 of selective channel presentation in the SCLP system 200. In operation, the system 200 generates, in real time, text from voice audio communication data. As used in this specification, "real time" means processing of the voice audio communication data in a manner that the resulting text is provided coincident with the audio data, subject to processing delay of the STT/TTS subsystem 204 and any transmission delays. For example, if the delay for the STT/TTS subsystem 204 required to generate text from audio data ranges from 1-2 seconds, then "real time" will be the processing time of 1-2 second and any additional network transmission time (which is typically on the order of hundreds of milliseconds).

The sever 200 receives voice communication data input by a user that is assigned to the communication channel (402). The voice communication data is typically digitized voice data provided in a stream, for example. Other audio data can also be processed, however.

The server 200 sends the voice data according to the communication channel grouping status and sets (404). For example, if the communication channel belongs to a first group of communication channels, then the voice data is sent to each other communication channel that is also of the first group. Conversely, if the communication channel belongs to a second group, then the voice data is sent to only the other communication channels that belong to the second group. The user device then presents the voice data as audio output (452).

While the voice data is being sent to user devices, the server 202 also generates text data based on the voice data (406). For example, a copy of the voice data stream is provided to the STT/TTS subsystem 204. The text, when generated, is then sent to other user devices according to the grouping status and sets. The user devices that receive the text then display the text (454). Because the lag is relatively minor (typically only a few seconds), the text data is displayed coincident with an audio presentation of the voice communication data. Accordingly, as used in this specification, "coincident" means that the text data is provided with the voice data, subject to the inherent processing delay of speech-to-text (or, conversely, and as described in the next paragraph, text-to-speech for text input and synthetic audio).

In a variation of FIG. 4, when the communication data that is received from user devices is text data, the STT/TTS subsystem 204 may be used to generate voice data and send the voice data for coincident presentation with the text data. In an implementation, the server 200 determines the type of data input by a user, e.g., text or voice, and automatically generates corresponding voice or text. In this way all other users can be provided with the communication, regardless of any particular user's user device capabilities. For example, a user that is using only a headset can still receive a text communication from another user, as the text communication is automatically converted to speech.

FIGS. 5-8 are illustrations of a user interface 400 displayed on a user device during a selective grouping and ungrouping of communication channels. It is to be understood that the user device associated with the user interface includes a microphone and speaker, and that the user of the user device is being presented with voice audio of various speakers, and provides voice audio as input to be provided to other user devices.

The user interface 500 includes a first area 502 in which are listed actionable icons. Each respective actionable icon corresponds to a respective communication channel and includes a label displaying an identifier of the communication channel. For example, the actionable icon 520 at the top of list includes the label "Drums-John," identifying the communication channel associated a drummer named John, and so on.

Each actionable icon includes a visual indicator that indicates a communication status of the channel to which it corresponds. The visual indicators may be static, which means they do not change in appearance when communications are incoming from a channel for a particular icon, or they may be dynamic, which means they do change when communications are incoming from a channel for a particular icon. For example, the icons 522, 524, 526, 528, 530, 532, 534, 536, 540, 544 and 546 may each correspond to communication channels that belong to a first group, and thus may have a first predefined color, e.g., white. Thus, when anyone speaks into a user device associated with the communication channel, the audio and text are provided and presented at each user device corresponding to the icons 522, 524, 526, 528, 530, 532, 534, 536, 540, 544 and 546. Here, the visual indicators are a color indicator, e.g., white. When a communication is not coming in on a particular channel, the corresponding actionable icon is solid white.

Figure 5:
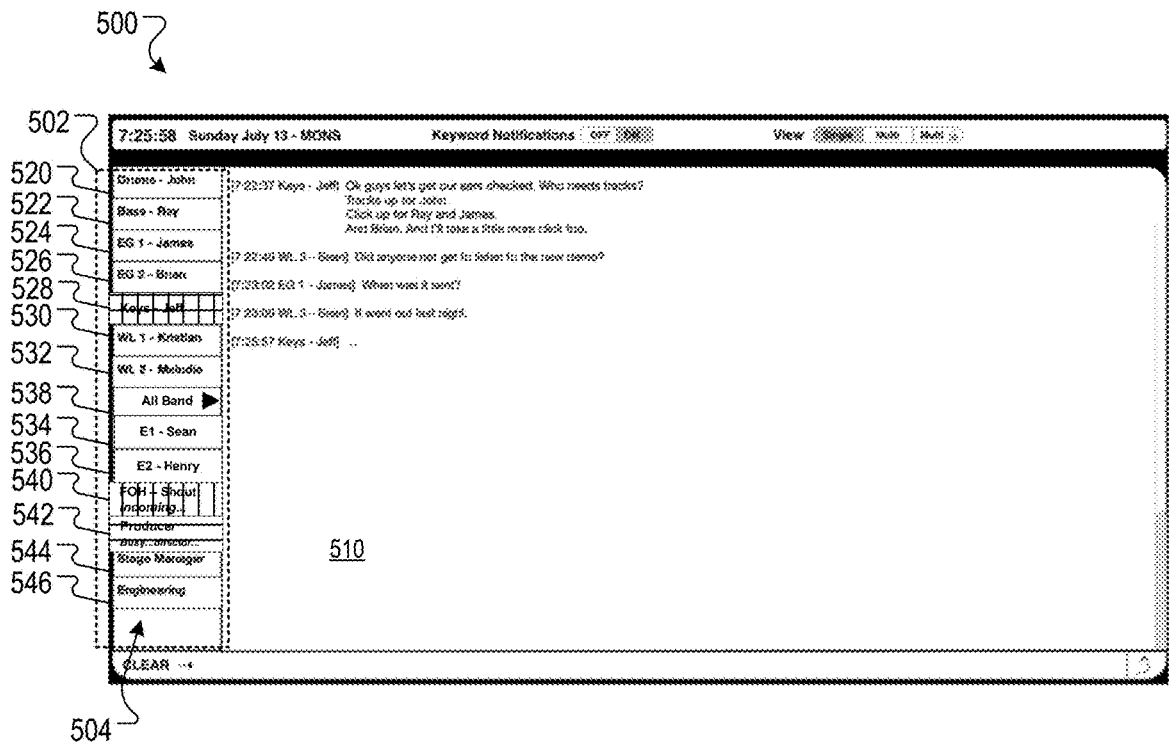

However, when a person is speaking, the visual indicator may change to indicate the person is speaking, e.g., by changing to a predefined color, e.g., green, flashing green and white, etc. In FIG. 5, the person on the communication channel for the icon 528 (a keyboard player named Jeff) is speaking, and thus the visual indicator has temporarily changed, as indicated by the first fill pattern.

Conversely, the actionable icon 540 has a visual indicator that that is different from the visual indicators for icons 522, 524, 526, 528, 530, 532, 534, 536, 540, 544 and 546. Here, the icon 540 has a second visual indictor that is of a different color from the color of the visual indicators for icons 522, 524, 526, 528, 530, 532, 534, 536, 540, 544 and 546, and is not of the color that may be used to indicate a person is speaking. Instead, the icon may be, e.g., a mustard color, indicating the person on the channel for the icon 540 is in a direct communication with another person, i.e., the director, and thus their respective Typically the communication data that is displayed on a user device is the communication data from a group of the communication channel associated with the user device. Accordingly, because the user of the user device displaying the user interface 500 is neither the director nor the producer, and belongs to the first group, e.g., the user interface is of the user device for Sean, the communication data for conversation between the producer (actionable icon 542) and the director is not presented in the user interface 500.

In some implementations, a request directed to a user of a user device from another user may be indicated by the actionable icon of the other user. For example, as shown in FIG. 5, the FOH engineer has issued an incoming request to the user of the user device displaying the user interface 500, as indicated by the text "incoming . . . " The color of the actionable icon may also change in response, e.g., become red, as indicated by the second fill pattern. Selection of the actionable icon can result in the presentation of a context menu to either accept or deny the incoming request. If the request is accepted, the communication channel associated with the user device and the communication channel associated with the requesting user device are grouped into a new grouping.

Some actionable icons may be associated with one or more communication channels. For example, the icon 538 has the label "All Band" followed by a context symbol "+", indicating that a selection of the icon 538 can be used to select the icons for some or all band members' communication channels. This can be used, for example, to quickly establish a grouping with all members of the band. Such predefined actionable icons can be configured by users through the use of a configuration menu, and the configuration is stored in the data store 202.

The user interface includes a second display area 510 in which communication data for the group to which the communication channel of the particular device belongs is displayed. In FIG. 5, the user device is Sean's, and as shown by his actionable icon 534, the communication channel of his device belongs to the first group. Thus, in the second display area 510, for each communication channel of the first group for which communication data is received, text data based on the communication data is displayed, along with a labeled identifier of the communication channel. For example, as shown in FIG. 5, there have been four separate communications from three people that have spoken over the direct grouping of communication channels. Currently, a fifth communication is being uttered by Jeff. The audio can be heard by listeners, and, as indicated by the ellipsis after the text label [7:25:57 Keys-Jeff], the server 200 is in the process of converting the voice audio uttered by Jeff to text.

Figure 6:
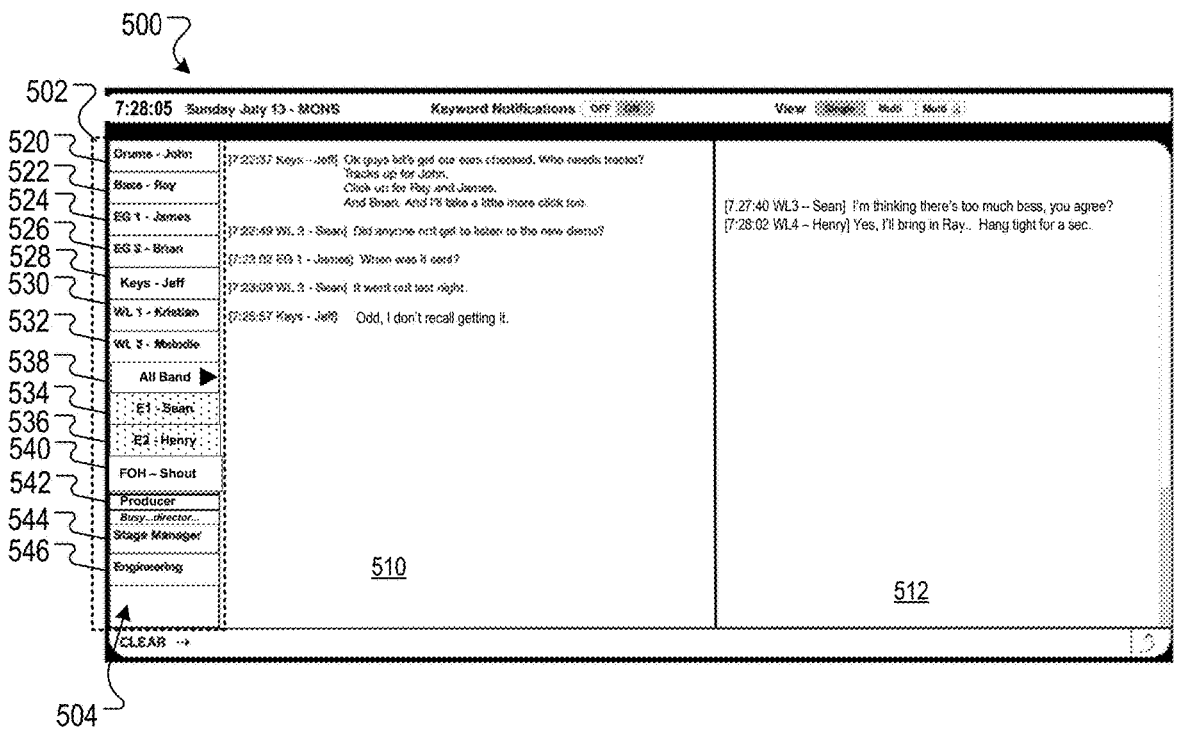

The actionable icons may be selected by a user to, for example, change a status of a communication channel to establish a direct communication between two or more communication channels. For example, as shown in FIG. 6, the user of the user device, e.g., Sean, selected the actionable icon 536 for a communication channel of a device being used by Henry. This selection results in the establishment of communication group of the channels corresponding to Sean and Henry's user devices, i.e., the communication channels of their respective devices have their grouping status changed so they belong to a second group are thus grouped together. Note that while the communication channels for the devices being used by the producer and director indicate a direction communication between those two parties, those channels are not grouped with the channels for Sean and Henry. In other words, communication channels may be grouped in two or more separate mutually exclusive sets.

Because the user device of Sean is the one that initiated the direct communication with the user device of Henry, the user interface 500, which is the user interface of the user device used by Sean, shows a third area 512 in which the text of their audio is displayed. The user interface of Henry's user device will also show a third area as well. However, the user interfaces for the other user devices will not show the third area, as none of those devices is grouped in the direct communication between Sean and Henry's user devices. This is because the display data that further causes user devices associated with actionable icons 534 and 536, that are grouped due to Sean's selection of the icon 536, is provided to only the user devices associated with actionable icons 534 and 536.

Figures 7, 8:
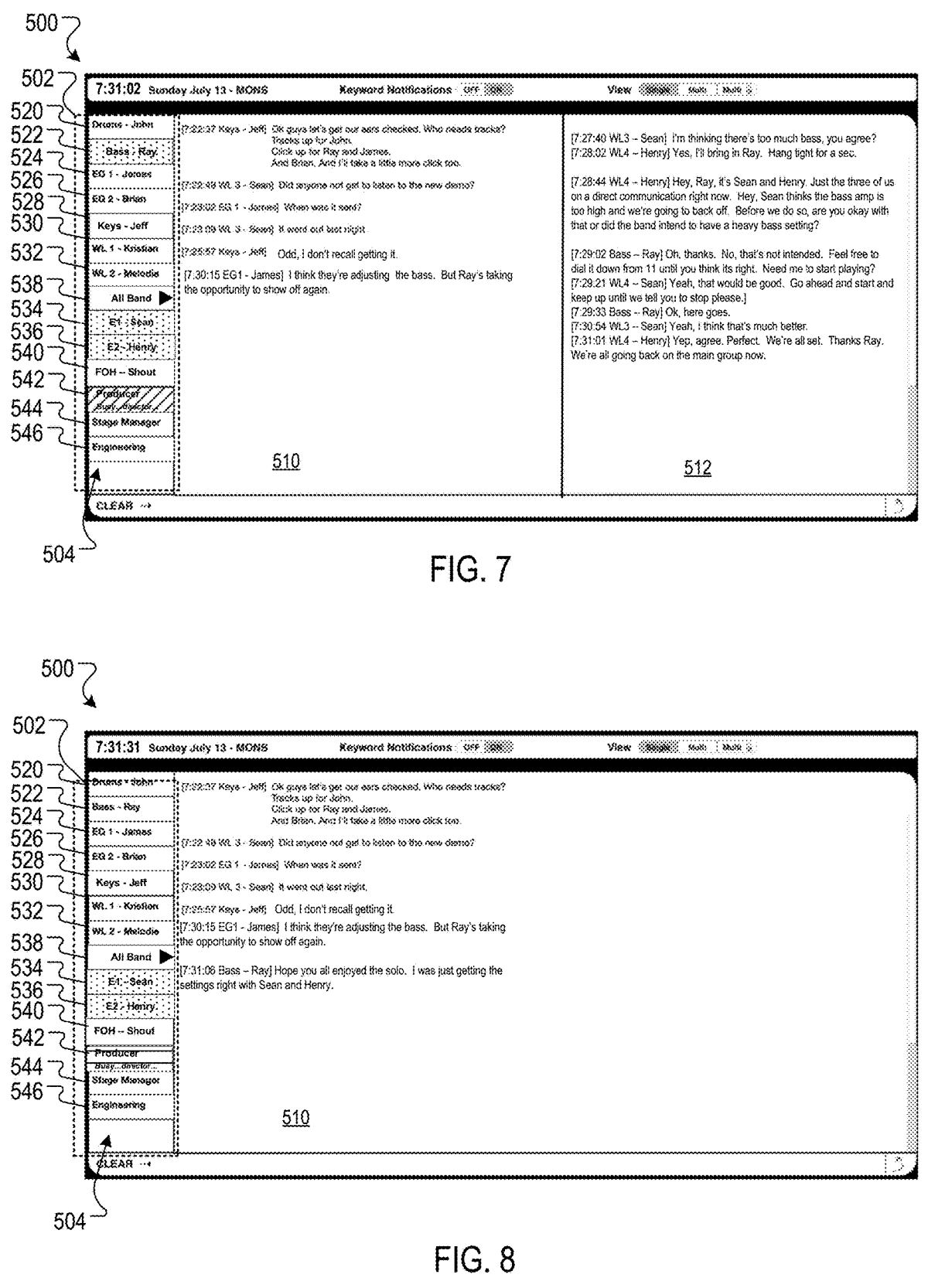

As depicted in FIG. 6, Sean and Henry are discussing the bass level of the bass in the band, and Henry has decided to bring in the bass player, Ray. Thus, Henry, at his user device, selects the actionable icon 522, which corresponds to the user device of Ray. Accordingly, the grouping status of the communication channel for Ray's user device is changed so that is groped in the second group, as shown in FIG. 7. Because the change was initiated from a user device that is already in the second group (Henry's user device), the communication channel for Ray's user device is grouped with the communication channels for Sean and Henry's user devices. This is indicated by the actionable icons 522, 534 and 536 all having the same visual indicator, e.g., a third fill pattern or color, that is different form the visual indicators of all the other actionable icons.

Note that the user interfaces for other user devices not part of the direct grouping will not show the third area 512, but their respective actionable icons 522, 534 and 536 will visually indicate, e.g., by shading, color coding, etc., that those corresponding communication channels are grouped in the second group.

As illustrated by the speech to text data in the third area, the parties spend several minutes adjusting the bass level. Once the issue is resolved, the user, Henry, ends the grouping for the communication channels. This can be done, for example, by any appropriate user interaction model, e.g., by "long selecting" any one of the three actionable icons 520, 534, and 536 to cease the grouping, or by individually selecting each actionable icon 520, 534, and 536 to remove each corresponding communication channel from the grouping. Thereafter, the third area 512 is removed from the user interface 500, and the user interface 500 reverts to that shown in FIG. 8. While the text of the conversation is no longer displayed, it is stored in the data store 202 of the sever 200 for later retrieval for review.

In other implementations, display data that causes user devices associated with actionable icons that are grouped in a subset can be provided to all user devices, including user devices that are not on communication channels that are grouped in the subset. This enables all users to monitory the text of the conversation, if desired, but not listing to the voice audio.

Note that some user devices may not have a display. For example, the bass player, Ray, may only have a wireless headset. Thus, display data and text data will not be sent to Ray's device, but audio data is sent to his device according to the group to which his device's communication channel belongs.

Figure 9:
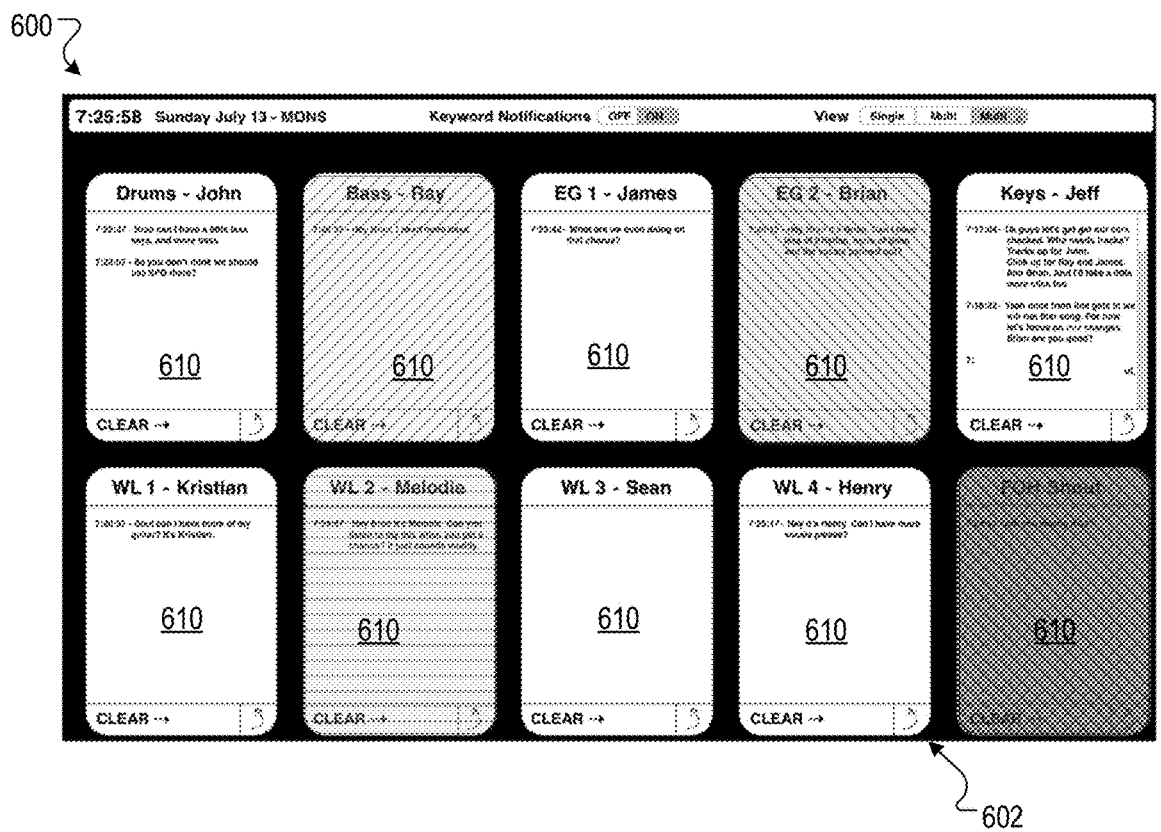
FIG. 9 is an illustration of a variation of the user interface of FIG. 5

FIG. 9 is an illustration of a variation of the user interface of FIG. 5. In FIG. 9, the user interface 600 displays the actionable icons in a tiled format. In this configuration, the first display area 602 displays the respective actionable icons in a first region of the user interface in a tile format, e.g., within a window the actionable icons appear as separate tiles. The second display area 610, in which corresponding text is displayed, comprises respective display areas within each actionable icon. In this configuration, each respective display area of each actionable icon displays only the text data for the communication channel for the actionable icon. In other words, only the user's text data generated by the user's utterances (or typed in by the user) is displayed in the actionable icon associated with the user's user device.

Selection of a tiled actionable icon can instantiate the same operations as a selection of an actionable icon in the list format of FIGS. 5-8. Display areas 610 can be divided into sections, with respective third sections (not shown) that display the text of voice audio provided during a direct conversation.

A variety of interaction models can be used for the actionable icons. For example, a toggle interaction model can be used in which selection of an icon toggles the communication state of the icon and its corresponding channel until a subsequent press. In an alternate implementation, a touch to talk interaction model can be used in which the communication state of an icon and its correspond channel change state for the duration of the press of the icon, and reverts to its original state after the press is release.

The use of hot words/keywords to manage communication channel status can also be used. This enables the users that are at audio stations that require constant manipulation (e.g., an audio mixer managing sound during a performance transition) to still initiate direct conversations with others by a hot work/keyword utterance (e.g., "go direct with Sean", where "go direct" is a hot word phrase that will initiate a direct communication over the channel of the identified recipient(s); "group Sean, Henry and Ray", etc.).

Figure 10:
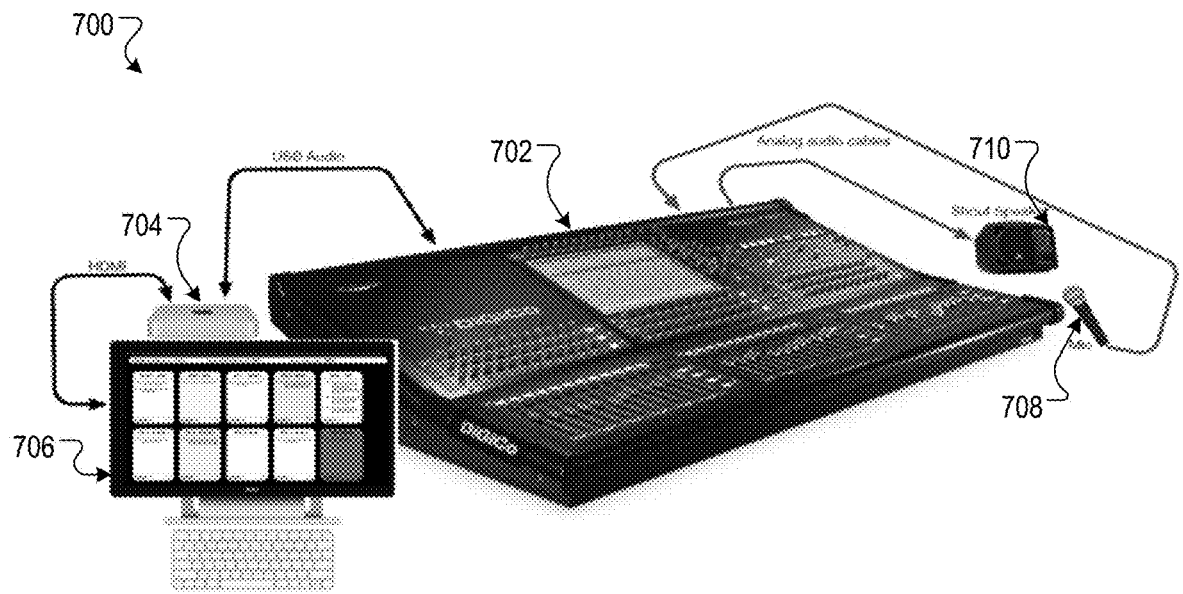
FIG. 10 is a diagram of an implementation in which the SCLP can be integrated with an existing audio system.

FIG. 10 is a diagram of an implementation 700 in which the SCLP system can be integrated with an existing audio system 702. For example, a USB connection can be used to connect an existing audio system 702 to a computer 704 programmed to perform the operations described above. The display 706 can display the user interfaces of FIGS. 5-9. Voice input can be provided via the microphone 708, and audio presented via the speaker 710.

Figure 11:
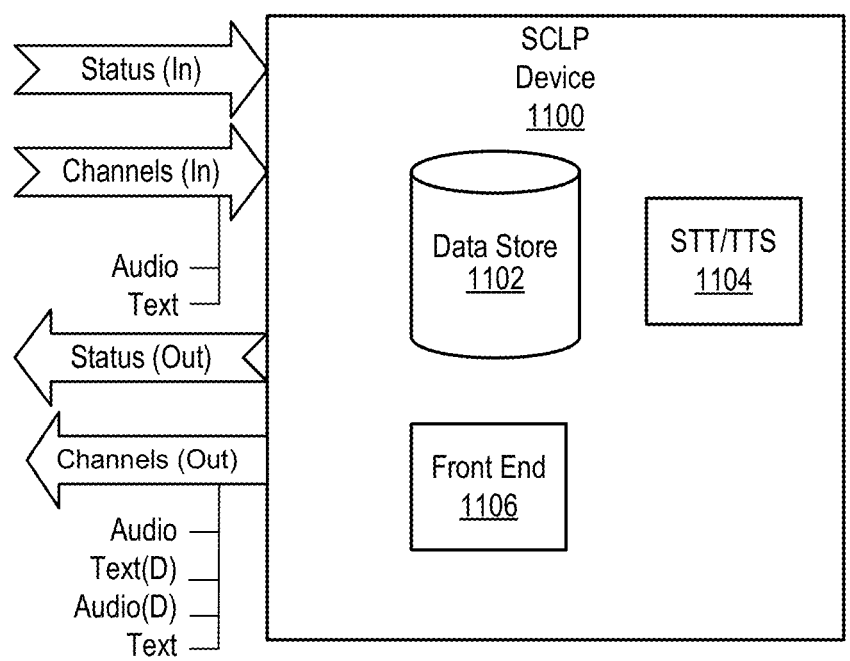
FIG. 11 is a block diagram of a SCLP peer device.

FIG. 11 is a block diagram of a SCLP peer device 1100. In many respects, the operations of the device of FIG. 11 are similar to the device of FIG. 2. Each peer device 1100 is a user device. However, instead of providing display data to each user device, each peer device manages its own display data in response to receiving system status from other peer devices (Status (In)) and providing changes to its own status to other system devices (Status (Out)). For example, assume the peer device 1100 is the device associated with the user Sean in FIGS. 5-8. When Sean selects the actionable icon 536, corresponding to Henry's peer device, the request is sent from Sean's device to Henry's device. When Henry accepts, which will result in a change of channel groupings, Henry's device sends update data to all other user devices. Each other user device, by use of its own front end 1106, then updates its respective display data and adjusts its local channels status data in the data store 1102 so that channel data is routed and processed accordingly.

Text-to-speech and speech-to-text can be done on each device upon input by a local SST/TTS subsystem 1104, and output to other user devices. When audio data is received without text, e.g., from a wireless headset from a band member, then the system can perform speech-to-text locally for local display.

In all other respects, the functions and operations described above can be performed in the peer-to-peer fashion described above.

As will be appreciated, the systems and methods described above can be useful for multiple other scenarios. For example, an audio engineer mixing monitors for a band is in sound check and the lead singer, keys player and drummer quickly request a total of 12 changes for their monitor mixes over the course of 20 seconds. After getting through the first four mix changes she doesn't remember the last eight that were requested, so she looks at the screen and reads the transcribed speech that shows who asked for what, and completes the changes without having to ask anyone to repeat what they said.

Likewise, a FOH audio engineer who is mixing the house sound for a corporate show needs to communicate to the monitor engineer to troubleshoot a problem. The keynote speaker is on stage and the room is very quiet, so talking into a microphone at FOH would be distracting to the audience. Additionally, the monitor engineer is away from his console already troubleshooting the issue backstage. The FOH engineer selects the monitor engineer for a direct communication, types out his message to the monitor engineer, and only monitor engineer hears a TTS transcription of the message in his in-ear monitors. Other production workers are not distracted by the message, as the FOH engineer selected a direct communication with the monitor engineer.

By way of another example, an award show is in progress, but the talent slips while walking onto stage and the show unexpectedly goes off script. The video director quickly reaches for the screen to speak to the show producer to ask what to do, but instead of blindly speaking and potentially interrupting a critical conversation, he sees that the Producer actionable icon on his screen states 'Busy . . . Stage Manager' and understands the Producer is currently in direct conversation with the stage manager. Thus, the video director does not attempt to disturb the producer or stage manager, nor does the producer utter something over the group communication, as presumably the issue is being handled.

While actionable icons have been described for selecting a status of a communication channel with which it is associated, the icons can be used to perform other actions as well. For example, selection of an actionable icon at a particular user device can be used to mute or unmute the audio of a communication channel at the user device. Any appropriate interaction model can be used to facilitate the selection of different actions. For example, the selection of the icon may generate a context menu from which one of multiple actions can be selected to be performed. Likewise, different touch commands can be used to invoke different actions, e.g., a tap can be used to mute or un-mute a communication channel, while a swipe can be used to change a status of a communication channel. Other appropriate interaction models can also be used.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data processing apparatus including one or more computers;
a non-transitory computer storage medium in data communication with the data processing apparatus and storing instructions executable by the data processing apparatus and that upon such execution cause the data processing apparatus to perform operations comprising:
for each communication channel of a plurality of communication channels, determine a grouping status of the communication channel, the grouping status for each communication channel defining one of a particular group to which the communication channel belongs or that the communication channel does not belong to a particular group;
determining a first set of communication channels belonging to a first group;
receiving, from each communication channel of the plurality of communication channels, communication data input by a user that is assigned to the communication channel;
generating display data that causes a user device to display a user interface comprising:
a first display area listing actionable icons, each respective actionable icon corresponding to a respective communication channel, each actionable icon including a label displaying an identifier of the communication channel and a visual indicator, and wherein each actionable icon for each of communication channels that belongs to the first group has a first visual indicator;
a second display area in which, for each communication channel belonging to the first group for which communication data is received, text data based on the communication data is displayed, and wherein the text data for each communication channel is labeled with an identifier of the communication channel;
providing the display data to a plurality of user devices, each user device associated with a respective one of the communication channels belonging to the first group, and having a display in which the user interface based on the display data is displayed;
receiving, from one of the user devices associated with a first actionable icon that corresponds to a communication channel belonging to the first group, selection data indicating a selection of a second actionable icon;
in response to the selection data:
changing the grouping status of the communication channels corresponding to the first actionable icon and the second actionable icon to cause the communication channels to belong to a second group;
generating updated display data that changes the visual indicator of the first actionable icon and the second actionable icon to a second visual indicator that is different from the first visual indicator; and
providing the updated display data to each of the user devices;
wherein:
the communication data input by a user is voice communication data uttered by the user that is assigned to the communication channel; and
further comprising, for each communication channel:
generating, in real time and for each communication channel, the text data from the voice communication data uttered by the user assigned to the communication channel;
for each communication channel belonging to the first group for which voice communication data is received, the text data is provided to a corresponding user device for displayed coincident with an audio presentation of the voice communication data;
further comprising:
generating display data that causes a user device to display a user interface comprising:
a third display area in which, for each communication channel belonging to the second group for which communication data is received, the text data based on the communication data is displayed, and wherein the text data is labeled with an identifier of the communication channel;
providing the display data to each user device associated with a respective one of the communication channels belonging to the second group; and
for each communication channel belonging to the second group for which voice communication data is received, the text data is provided to each user device associated with a respective one of the communication channels belonging to the second group coincident with an audio presentation of the voice communication data;
wherein the display data causes the user device to display the third display area is provided to only the user devices associated with the communication channels belonging to the second group.

2. The system of claim 1, wherein:
the display data causes the user device to display the second display area is provided to only the user devices associated with the communication channels belonging to the first group.

3. The system of claim 1, the operations further comprising:
receiving, from one of the user devices associated with the first or second actionable icon, selection data indicating a selection of a third actionable icon;
in response to the selection data:
changing the grouping status of the communication channel corresponding to the third actionable icon to cause the communication channel to belong to the second group;
generating updated display data that changes the visual indicator of the third actionable icon to the second visual indicator; and
providing the updated display data to each of the user devices.

4. The system of claim 1, wherein:
the first display area lists the respective actionable icons in a first region of the display in a list format; and
the second display area is separate from the first display area and displays the text data in a list format.

5. A system, comprising:
a data processing apparatus including one or more computers;
a non-transitory computer storage medium in data communication with the data processing apparatus and storing instructions executable by the data processing apparatus and that upon such execution cause the data processing apparatus to perform operations comprising:

for each communication channel of a plurality of communication channels, determine a grouping status of the communication channel, the grouping status for each communication channel defining one of a particular group to which the communication channel belongs or that the communication channel does not belong to a particular group;

determining a first set of communication channels belonging to a first group;

receiving, from each communication channel of the plurality of communication channels, communication data input by a user that is assigned to the communication channel;

generating display data that causes a user device to display a user interface comprising:
  a first display area listing actionable icons, each respective actionable icon corresponding to a respective communication channel, each actionable icon including a label displaying an identifier of the communication channel and a visual indicator, and wherein each actionable icon for each of communication channels that belongs to the first group has a first visual indicator;
  a second display area in which, for each communication channel belonging to the first group for which communication data is received, text data based on the communication data is displayed, and wherein the text data for each communication channel is labeled with an identifier of the communication channel;

providing the display data to a plurality of user devices, each user device associated with a respective one of the communication channels belonging to the first group, and having a display in which the user interface based on the display data is displayed;

receiving, from one of the user devices associated with a first actionable icon that corresponds to a communication channel belonging to the first group, selection data indicating a selection of a second actionable icon;

in response to the selection data:
  changing the grouping status of the communication channels corresponding to the first actionable icon and the second actionable icon to cause the communication channels to belong to a second group;
  generating updated display data that changes the visual indicator of the first actionable icon and the second actionable icon to a second visual indicator that is different from the first visual indicator; and
  providing the updated display data to each of the user devices;

wherein:
the communication data input by a user is voice communication data uttered by the user that is assigned to the communication channel; and further comprising, for each communication channel:
  generating, in real time and for each communication channel, the text data from the voice communication data uttered by the user assigned to the communication channel;
  for each communication channel belonging to the first group for which voice communication data is received, the text data is provided to a corresponding user device for displayed coincident with an audio presentation of the voice communication data;

the first display area displays the respective actionable icons in a first region of the display in a tile format; and the second display area comprises respective display areas within each actionable icon, and in each respective display area of each actionable icon only the text data for the communication channel for the actionable icon is displayed.

6. A user device, comprising:
a data processing apparatus and a display device;
a non-transitory computer storage medium in data communication with the data processing apparatus and storing instructions executable by the data processing apparatus and that upon such execution cause the data processing apparatus to perform operations comprising:

displaying, in a user interface of the user device:
  a first display area listing a respective actionable icon for a respective communication channel of a plurality of communication channels, each actionable icon including a label displaying an identifier of the communication channel and a visual indicator, and wherein each actionable icon for each of the communication channels that belongs to a first group has a first visual indicator;
  a second display area in which, for each communication channel of the first group for which voice communication data is received, text data based on the voice communication data is displayed, and wherein the text data for each communication channel is labeled with an identifier of the communication channel;

wherein in response to the user device being associated with a first actionable icon for a communication channel belonging to the first group, the user device presents voice communication data from all other communication channels belonging to the first group, and not presenting voice communication data from other channels that do not belong to the first group;

in response to a selection by a user of the user device of a second actionable icon displayed in the user interface:
  the grouping status of the communication channels associated with the first actionable icon and second actionable icon are changed to belong to a second group;
  the visual indicators of the first actionable icon and second actionable icon are changed to a second visual indicator that is different from the first visual indicator; and
  the user device presents voice communication data from only the communication channel associated with the second actionable icon;

wherein for each communication channel for which voice communication data is presented at the user device, the text data is displayed coincident with an audio presentation of the voice communication data; and wherein the selection of the second actionable icon is a toggle selection, and the communication channels corresponding to the first actionable icon and the second actionable icon belong to the second group until another selection of the second actionable icon at the user device associated with the first actionable icon, and in response to the another selection of the second actionable icon:
the status of the communication channels associated with the first actionable icon and second actionable icon revert to a prior group status, wherein the status of the communication channel reverts to belonging to the first group; and the visual indicators of the first actionable icon and second actionable icon revert to their prior visual indicators.

7. A user device, comprising:

a data processing apparatus and a display device;

a non-transitory computer storage medium in data communication with the data processing apparatus and storing instructions executable by the data processing apparatus and that upon such execution cause the data processing apparatus to perform operations comprising:

displaying, in a user interface of the user device:
 a first display area listing a respective actionable icon for a respective communication channel of a plurality of communication channels, each actionable icon including a label displaying an identifier of the communication channel and a visual indicator, and wherein each actionable icon for each of the communication channels that belongs to a first group has a first visual indicator;
 a second display area in which, for each communication channel of the first group for which voice communication data is received, text data based on the voice communication data is displayed, and wherein the text data for each communication channel is labeled with an identifier of the communication channel;

wherein in response to the user device being associated with a first actionable icon for a communication channel belonging to the first group, the user device presents voice communication data from all other communication channels belonging to the first group, and not presenting voice communication data from other channels that do not belong to the first group;

in response to a selection by a user of the user device of a second actionable icon displayed in the user interface:
 the grouping status of the communication channels associated with the first actionable icon and second actionable icon are changed to belong to a second group;
 the visual indicators of the first actionable icon and second actionable icon are changed to a second visual indicator that is different from the first visual indicator; and
 the user device presents voice communication data from only the communication channel associated with the second actionable icon;

wherein for each communication channel for which voice communication data is presented at the user device, the text data is displayed coincident with an audio presentation of the voice communication data; and wherein the selection of the second actionable icon is a press selection, and the communication channels associated with the first actionable icon and the second actionable icon belong to the second group for a duration of the press selection of the second actionable icon, and revert to their prior group status at the cessation of the press selection.

8. A computer-implemented method, comprising the operations of:

for each communication channel of a plurality of communication channels, determine a grouping status of the communication channel, the grouping status for each communication channel defining one of a particular group to which the communication channel belongs or that the communication channel does not belong to a particular group;

determining a first set of communication channels belonging to a first group;

receiving, from each communication channel of the plurality of communication channels, communication data input by a user that is assigned to the communication channel;

generating display data that causes a user device to display a user interface comprising:
 a first display area listing actionable icons, each respective actionable icon corresponding to a respective communication channel, each actionable icon including a label displaying an identifier of the communication channel and a visual indicator, and wherein each actionable icon for each of communication channels that belongs to the first group has a first visual indicator;
 a second display area in which, for each communication channel belonging to the first group for which communication data is received, text data based on the communication data is displayed, and wherein the text data for each communication channel is labeled with an identifier of the communication channel;

providing the display data to a plurality of user devices, each user device associated with a respective one of the communication channels belonging to the first group, and having a display in which the user interface based on the display data is displayed;

receiving, from one of the user devices associated with a first actionable icon that corresponds to a communication channel belonging to the first group, selection data indicating a selection of a second actionable icon;

in response to the selection data:
 changing the grouping status of the communication channels corresponding to the first actionable icon and the second actionable icon to cause the communication channels to belong to a second group;
 generating updated display data that changes the visual indicator of the first actionable icon and the second actionable icon to a second visual indicator that is different from the first visual indicator; and
 providing the updated display data to each of the user devices;

wherein:

the communication data input by a user is voice communication data uttered by the user that is assigned to the communication channel; and further comprising, for each communication channel:
 generating, in real time and for each communication channel, the text data from the voice communication data uttered by the user assigned to the communication channel;
 for each communication channel belonging to the first group for which voice communication data is received, the text data is provided to a corresponding user device for displayed coincident with an audio presentation of the voice communication data;

further comprising:

generating display data that causes a user device to display a user interface comprising:
 a third display area in which, for each communication channel belonging to the second group for which communication data is received, the text data based on the communication data is displayed, and wherein the text data is labeled with an identifier of the communication channel;

providing the display data to each user device associated with a respective one of the communication channels belonging to the second group; and for each communication channel belonging to the second group for which voice communication data is received, the text data is provided to each user device associated with a respective one of the communication channels belonging to the second group coincident with an audio presentation of the voice communication data;

wherein the display data causes the user device to display the third display area is provided to only the user devices associated with the communication channels belonging to the second group.

9. The computer-implemented method of claim 8, wherein:

the communication data input by a user is voice communication data uttered by the user that is assigned to the communication channel; and further comprising, for each communication channel, the operations of:

generating, in real time and for each communication channel, the text data from the voice communication data uttered by the user assigned to the communication channel;

for each communication channel belonging to the first group for which voice communication data is received, the text data is provided to a corresponding user device for displayed coincident with an audio presentation of the voice communication data.

10. A computer-implemented method, comprising the operations of:

displaying, in a user interface of a user device:

a first display area listing a respective actionable icon for a respective communication channel of a plurality of communication channels, each actionable icon including a label displaying an identifier of the communication channel and a visual indicator, and wherein each actionable icon for each of the communication channels that belongs to a first group has a first visual indicator;

a second display area in which, for each communication channel of the first group for which voice communication data is received, text data based on the voice communication data is displayed, and wherein the text data for each communication channel is labeled with an identifier of the communication channel;

wherein in response to the user device being associated with a first actionable icon for a communication channel belonging to the first group, the user device presents voice communication data from all other communication channels belonging to the first group, and not presenting voice communication data from other channels that do not belong to the first group;

in response to a selection by a user of the user device of a second actionable icon displayed in the user interface:

the grouping status of the communication channels associated with the first actionable icon and second actionable icon are changed to belong to a second group;

the visual indicators of the first actionable icon and second actionable icon are changed to a second visual indicator that is different from the first visual indicator; and the user device presents voice communication data from only the communication channel associated with the second actionable icon;

wherein for each communication channel for which voice communication data is presented at the user device, the text data is displayed coincident with an audio presentation of the voice communication data; and wherein the selection of the second actionable icon is a toggle selection, and the communication channels corresponding to the first actionable icon and the second actionable icon belong to the second group until another selection of the second actionable icon at the user device associated with the first actionable icon, and in response to the another selection of the second actionable icon:

the status of the communication channels associated with the first actionable icon and second actionable icon revert to a prior group status, wherein the status of the communication channel reverts to belonging to the first group; and the visual indicators of the first actionable icon and second actionable icon revert to their prior visual indicators.

* * * * *